Oct. 9, 1934.  F. W. GOERDES  1,976,665
HAND BAG FRAME
Filed July 5, 1933  3 Sheets-Sheet 1

Frederick W. Goerdes,
INVENTOR
BY Victor J. Evans & Co.
ATTORNEY

Oct. 9, 1934.  F. W. GOERDES  1,976,665
HAND BAG FRAME
Filed July 5, 1933  3 Sheets-Sheet 2

Frederick W. Goerdes, INVENTOR
BY Victor J. Evans & Co.
ATTORNEY

Oct. 9, 1934.    F. W. GOERDES    1,976,665
HAND BAG FRAME
Filed July 5, 1933    3 Sheets-Sheet 3

Frederick W. Goerdes, INVENTOR
BY Victor J. Evans & Co.
ATTORNEY

Patented Oct. 9, 1934 1,976,665

UNITED STATES PATENT OFFICE 1,976,665

HAND BAG FRAME

Frederick W. Goerdes, Newark, N. J., assignor to J. E. Mergott Company, Newark, N. J.

Application July 5, 1933, Serial No. 679,138

1 Claim. (Cl. 150—29)

This invention relates to ladies' pocketbook or handbag frames of general construction and has for the primary object the provision of means for providing a medium to which the frame fasteners and ornaments may be mounted and which presents a finished appearance to the frames and facilitates the securing of the pocketbook or handbag material to the frame.

With these and other objects in view this invention consists in certain novel features of construction, combination and arrangement of parts to be hereinafter more fully described and claimed.

For a complete understanding of my invention, reference is to be had to the following description and accompanying drawings, in which In the drawings.

Figure 1:
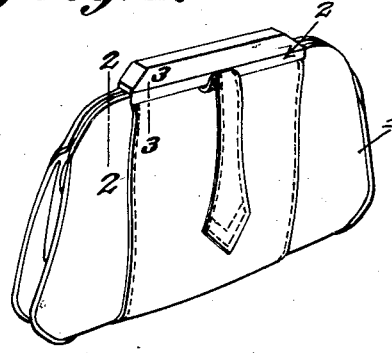
Figure 1 is a perspective view illustrating a lady's handbag or pocketbook having frames constructed in accordance with my invention.

Referring in detail to the drawings, the numeral 1 indicates the body of a lady's pocketbook or handbag to which is applied frames 2 forming the subject matter of the present invention. The frames 2 are employed at the mouth of the body and to which the edges of the material are secured. The ends of the frames are provided with barrels 3 aligning to receive pintles 4 for hingedly connecting the frames. The pintles 4 also form supports for the inner compartment frames 5 of the pocketbook or handbag. The frames 5 are of a conventional construction.

The frames 2 are each identically constructed and are constructed of a channel type. Each frame is of substantially U-shape with the channel opening outwardly through the outer edge to form the frame into the inverted type now commercially employed in pocketbooks or handbags. To render the frame semi-inverted the bottom wall of the channel is cutaway, as shown at 6, while one wall of the channel is bent angularly to form a combined attaching and finishing plate 7, the free end of which abuts the opposite wall of the channel. The plate 7 overlies the cutaway portion 6 and provides a medium to which the conventional type of fasteners may be riveted, soldered or otherwise secured. Also ornaments may be applied thereto.

Figures 2, 3:
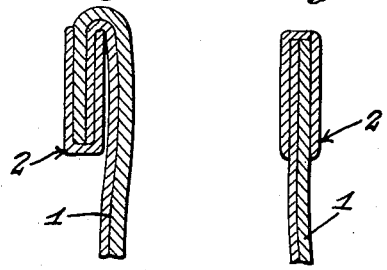
Figure 2 is a sectional view taken on the line 2—2 of Figure 1.
Figure 3 is a similar view taken on the line 3—3 of Figure 1.
Figure 4:
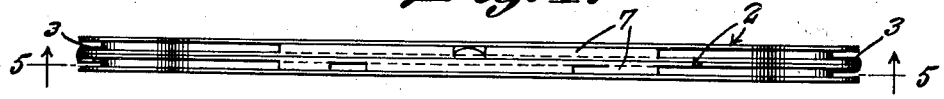
Figure 4 is a plan view illustrating the frame with the body of the pocketbook or handbag removed.
Figure 5:
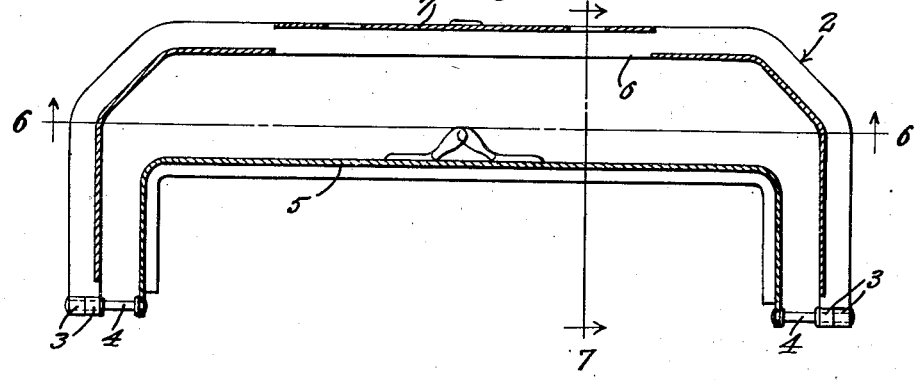
Figure 5 is a sectional view taken on the line 5—5 of Figure 4.
Figure 6:
Figure 6 is a sectional view taken on the line 6—6 of Figure 5.
Figure 7:
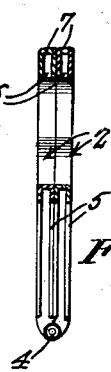
Figure 7 is a transverse sectional view taken on the line 7—7 of Figure 5.

Portions of the edges at the mouth of the bag may extend through the cutaway portion into the channel while the other edges are brought over the outer edges of the side walls, as shown in Figure 2, thereby effectively securing the body of the pocketbook or handbag to the frame with a finished appearance.

While the frames are illustrated as being substantially U-shaped it is to be understood that these frames may be sent into other shapes to suit the various designs of pocketbook or handbag bodies.

Figure 8:
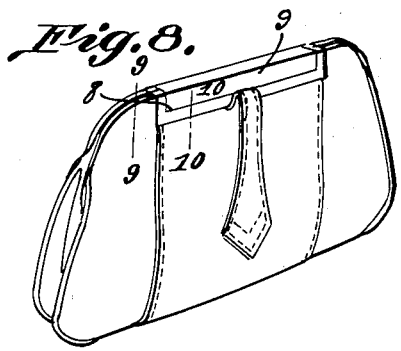
Figure 8 is a perspective view illustrating a pocketbook or handbag having a modified form of frames applied thereto.
Figures 9, 10:
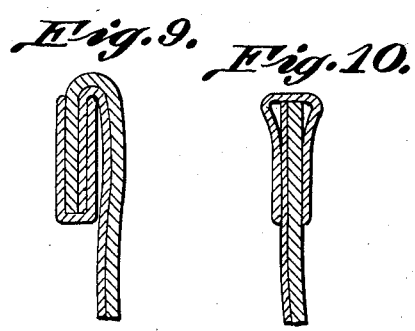
Figure 9 is a detail sectional view taken on the line 9—9 of Figure 8.
Figure 10 is a similar view taken on the line 10—10 of Figure 8.
Figure 11:
Figure 11 is a top plan view illustrating the modified form of frames.
Figure 12:
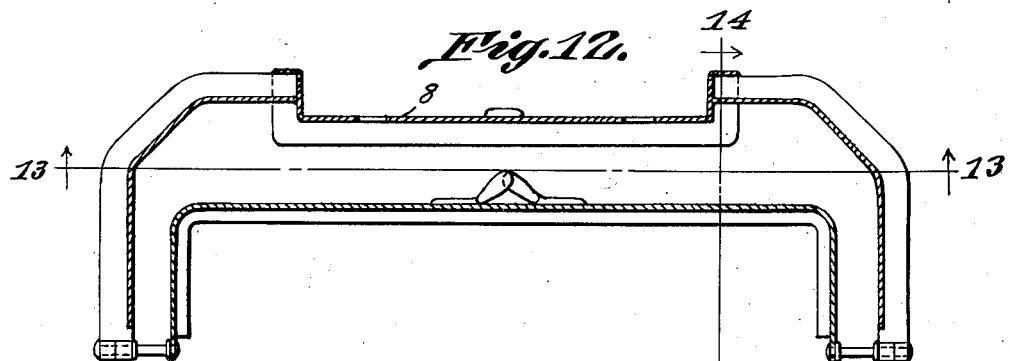
Figure 12 is a sectional view on the line 12—12 of Figure 11.
Figure 13:
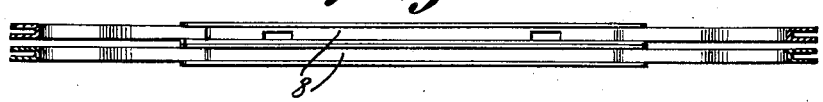
Figure 13 is a sectional view taken on the line 13—13 of Figure 12.
Figure 14:
Figure 14 is a transverse sectional view taken on the line 14—14 of Figure 12.

The form of frames shown in Figures 8 to 14 inclusive, are shaped similar to the frames 2 except each frame is provided with an inwardly offset portion 8. The offset portion 8 may form an integral part of the frame or may be a separate unit welded or otherwise secured to the frame. The offset 8 is of channel construction the same as the frame except the channel opens inwardly with respect to the frame or in an opposite direction to the channel of the frame. The offset 8 is especially adapted to receive a fastener or clasp 9 of the elongated type which may be soldered, riveted or otherwise secured to the offset. The fastener 9 when secured in the offset 8 lies flush with the edges of the mouth of the handbag, as shown in Figure 8.

Figure 15:
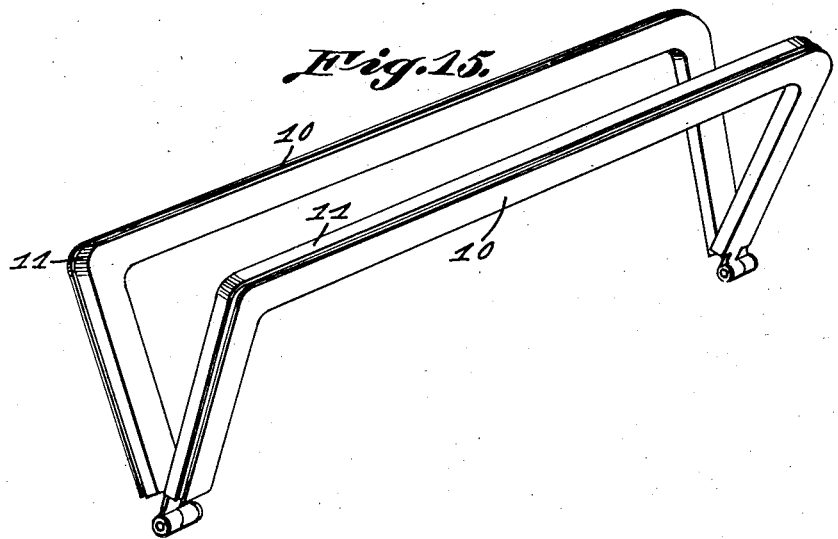
Figure 15 is a perspective view illustrating another form of frames.
Figure 16:
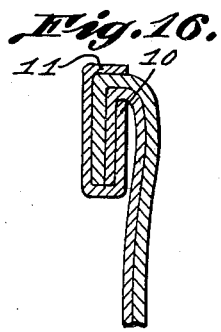
Figure 16 is a fragmentary transverse sectional view showing the material of the body of the pocketbook or handbag secured to the type of frame shown in Figure 15.

Referring to the form of frame shown in Figures 15 and 16, each frame is of channel construction, as shown at 10, with the channel opening outwardly so as to provide each frame of the inverted channel type. One wall of the channel of each frame is extended and bent angularly to form a flange 11 adapted to partially close the channel of the respective frame, leaving in the frame a comparatively narrow opening through which the material of the bag of the pocketbook or handbag may be inserted for securing within the channel. The flange 11 forms a finished appearance to the frame and to which the frame fasteners and other ornaments may be secured and as shown in the drawings may extend the full length of the frame or may be made shorter in length so as to terminate short of the side portions of the frame.

While I have shown and described the preferred embodiment of my invention, it will be understood that minor changes in construction, combination and arrangement of parts may be made without departing from the spirit and scope of my invention, as claimed.

Having described the invention, I claim:

A lady's pocketbook or handbag frame comprising hingedly connected channel frame members each having channel portions opening outwardly to form said members of the inverted type, each frame member having an inwardly offset channel portion opening inwardly in a reverse direction to said first channel portions of the respective frame and providing a seat in the frame to receive an elongated frame fastener and providing a wall to which said fastener may be secured.

FREDERICK W. GOERDES.